United States Patent [19]

Saur et al.

[11] Patent Number: 5,231,955
[45] Date of Patent: Aug. 3, 1993

[54] THERMOSTATIC VALVE ARRANGEMENT

[75] Inventors: Roland Saur, Stuttgart; Jürgen Kunze, Rutesheim; Barbu Frunzetti, Kornwestheim, all of Fed. Rep. of Germany

[73] Assignee: Behr-Thomson-Dehnstoffregler GmbH, Fed. Rep. of Germany

[21] Appl. No.: 925,656

[22] Filed: Aug. 7, 1992

[30] Foreign Application Priority Data

Aug. 16, 1991 [DE] Fed. Rep. of Germany ... 9110126[U]

[51] Int. Cl.$^5$ .............................................. F01P 7/14
[52] U.S. Cl. .................. 123/41.1; 236/34.5; 236/101 B
[58] Field of Search .............. 123/41.08, 41.09, 41.1; 236/34, 34.5, 101 B, 101 C, 99 E

[56] References Cited

U.S. PATENT DOCUMENTS 4,961,530 10/1990 Wagner .......................... 236/34.5

FOREIGN PATENT DOCUMENTS 9015766 3/1991 Fed. Rep. of Germany .

Primary Examiner—Noah P. Kamen
Attorney, Agent, or Firm—Evenson, McKeown, Edwards & Lenahan

[57] ABSTRACT

A thermostatic valve arrangement for a coolant control of an internal-combustion engine, having a thermostatic working element which is assigned to the coolant flow and the working piston of which is supported on an abutment which can be adjusted by an adjusting member. The adjusting member is arranged outside the coolant flow and is held in a receiving device which is constructed in one piece with a valve housing and is constructed of a plastic material. The adjusting member is detachably held by holding elements in the receiving device. Between the adjusting member and the working piston, transmitting devices are arranged which transmit the pressure forces and which form a sealing device sealing off the valve housing in the direction of the receiving device.

12 Claims, 1 Drawing Sheet

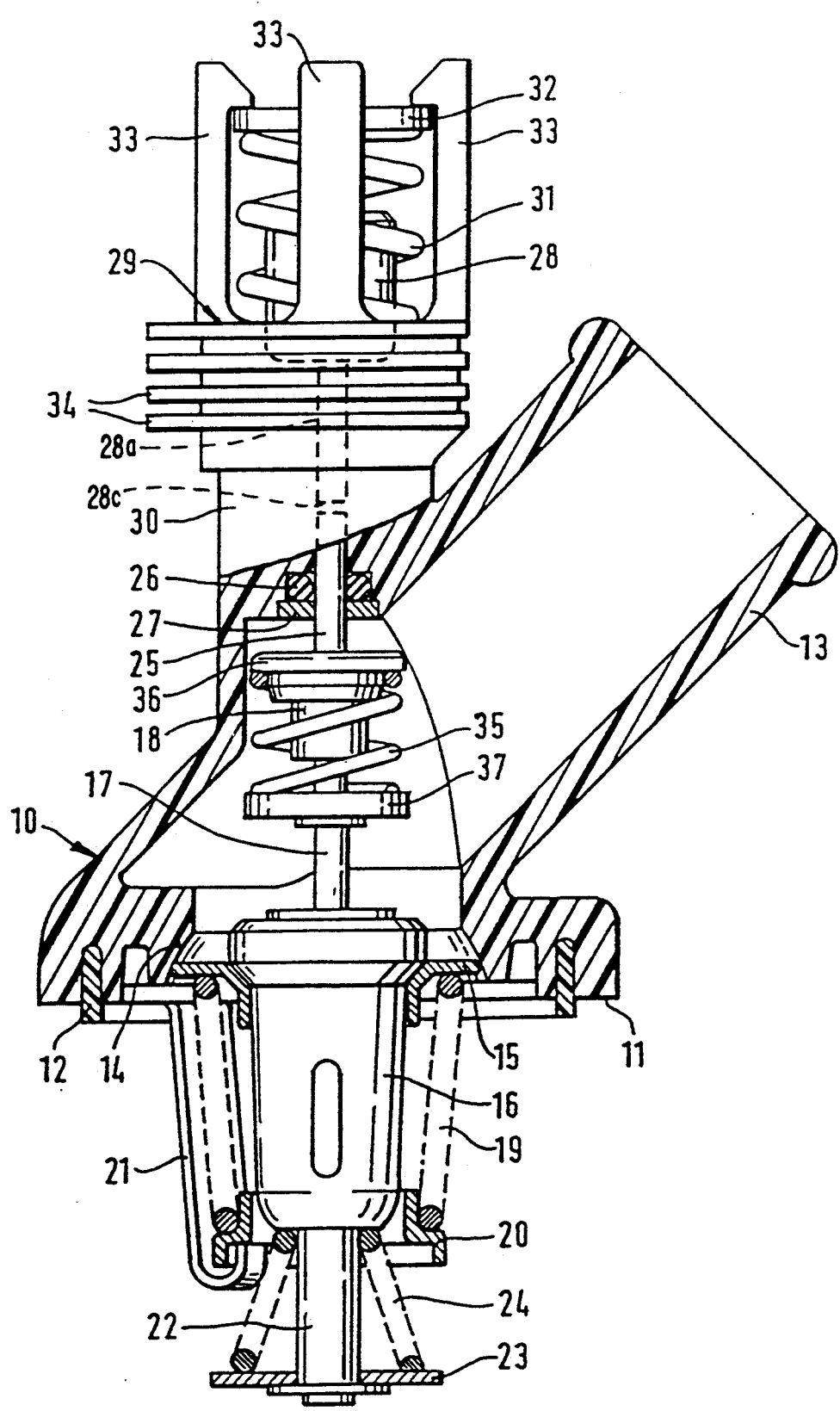

THERMOSTATIC VALVE ARRANGEMENT

BACKGROUND AND SUMMARY OF THE INVENTION

The present invention relates to thermostatic valve arrangement for a coolant control of an internal-combustion engine, having a thermostatic working element which is assigned to the coolant flow and the working piston of which is supported on an abutment. The abutment is adjustable by an adjusting member which is arranged outside the coolant flow and is held in a receiving device that is constructed in one piece with a valve housing.

German Patent Document DE-GM 90 15 766.4 shows a thermostatic valve arrangement in which the adjusting member is fitted into the receiving device of the valve housing made of an aluminum die casting and is held by means of a flanged construction. The piston of the adjusting member, which is constructed as a thermostatic working element, penetrates the valve housing. It is surrounded by a sealing ring.

An object of the present invention is to develop a thermostatic valve arrangement of the earlier described type in such a manner that the adjusting member can be detached from the valve housing and that this detachment can be carried out without allowing coolant to subsequently flow out via the receiving device.

This and other objects are achieved by the present invention which provides a valve housing that is made of a plastic material, with the adjusting member being detachably held in the receiving device by means of holding elements. Between the adjusting member and the working piston, transmitting devices are arranged which have the purpose of transmitting pressure forces and form a sealing device which seals off the valve housing in the direction of the receiving device.

The manufacturing of the valve housing made of a plastic material is advantageously simple and also has the advantage of a thermal separation from the adjusting member so that the temperature of the coolant does not interfere with the adjusting member.

Another advantage is that transmitting devices are arranged between the adjusting member and the working piston so that the adjusting member does not project into the coolant flow. In addition, the adjusting member is removable so that it can be detached from the housing for a check-up or an exchange. Since the sealing in the area of the transmitting devices takes place in such a manner that the adjusting member does not at all extend into the coolant flow, the coolant flow remains sealed off toward the outside even when the adjusting member is removed. The adjusting member can therefore be demounted and exchanged without the risk that coolant may flow out.

In an embodiment of the invention, the transmitting element is guided by a piston-type projection (or rod) in a bore leading to the receiving device and is surrounded by a sealing device. Thus, a reliable sealing is ensured in a simple manner.

In certain embodiments of the invention, the adjusting member is another thermostatic working element which is arranged in the receiving device in such a manner that a working piston is arranged coaxially with respect to the working piston of the first working element. Between the two working pistons, a transmitting element made of a heat-insulating material is arranged. As a result, it is possible to design the thermostatic working element serving as the adjusting element in such a manner that it responds to the ambient temperature and can therefore cause a control of the coolant temperature that is superimposed with this value. Since the valve housing is made of a plastic material and since the transmitting element also consists of a heat-insulating material, such as plastic, no direct heat transmittance takes place from the coolant to the adjusting member so that this adjusting member can in fact respond to the ambient temperature.

In certain embodiments of the invention, the valve housing and/or the receiving device are provided with devices for reducing a heat transmittance from the valve housing to the adjusting member. This results in a further improved thermal separation between the coolant and the adjusting member.

Other objects, advantages and novel features of the present invention will become apparent from the following detailed description of the invention when considered in conjunction with the accompanying drawings.

BRIEF DESCRIPTION OF THE DRAWINGS

The drawing illustrates a partial sectional view of a thermostatic valve arrangement constructed according to an embodiment of the present invention.

DETAILED DESCRIPTION OF THE DRAWINGS

The thermostatic valve arrangement illustrated in the drawing has a valve housing 10 which is made of plastic material as a molded plastic part in the illustrated embodiment. Preferably, a fiber-reinforced plastic material is used, such as a plastic material that is reinforced by glass fibers or carbon fibers.

The valve housing 10 has a flange 11 by which it is sealingly fastened to a housing part that is not shown, such as a cooling water duct of an engine block or the like. In the flange 11, a ring groove is provided into which a sealing ring 12 is inserted. The flange 11 forms a valve seat 14 which, together with a valve disk 15, forms a valve which controls the joining of the valve housing 10 to a hose connection 13. The valve disk 15, which may be a plastic preform, is held on the housing 16 of a thermostatic working element.

The housing 16 contains an expansion substance, particularly a wax, which, when a given temperature is reached and exceeded, changes its state and therefore its volume and thus drives out a working piston 17.

Against its moving-out direction, the working piston 17 is supported by a transmitting element on an adjustable abutment, that will be described later, in such a manner that, when the working piston 17 is moved out, the housing 16 is displaced against the moving-out direction of the working piston 17 against the effect of a closing spring 19 so that the valve disk 15 lifts off the valve seat 14. The closing spring 19 is supported by a supporting ring 20 on finger-type holding elements 21 which are molded in one piece to the valve housing 10 and which project away from the flange 11 against the moving-out direction. At least two holding elements 21 of this type are provided.

In addition, a pin 22 is mounted on the housing 16 on which a short-circuit valve disk 23 is slidably guided which is assigned to a short-circuit opening that is not shown. The short-circuit valve disk 23 is held by means of a short-circuit spring 24 which is supported on the short-circuit valve disk 23 and the housing 16.

The transmitting element 18, which is situated in the interior of the valve housing 10, has a receiving bore for the working piston 17 and a rod 25 which is guided toward the outside through the valve housing 10. The rod 25 is surrounded by a sealing ring 26 which is inserted into the valve housing 10 and is secured by a holding disk 27.

The working piston, having a stem 28a indicated in dashed lines, of another thermostatic working element 28 is situated opposite the rod 25 of the transmitting element 18, the stem 28a of this working element 28 forming the actual abutment at reference number 28c. By means of its housing, this thermostatic working element 28 is held in a receiving device 29 which, by way of a throat 30, is molded in one piece to the valve housing 10.

The piston of the thermostatic working element 28, which can be moved out, is disposed coaxially opposite the rod projection 25 of the transmitting element 18.

The housing of the thermostatic working element 28 is supported in the receiving device 29 and is held in the operating position by a securing spring 31. The securing spring 31, which is shown in the illustrated embodiment as a coil spring, is supported on the housing of the working element 28 at its (not visible in the Figure) end and, by means of its visible end, is supported on a disk 32.

The disk 32 is held by means of four finger-type projections 33 which project away from the receiving device 29, and are provided with detents which reach over the disk 32. The finger-type projections 33 can be bent open elastically toward the outside so that the disk 32 and therefore the spring and also the thermostatic working element 28 can be removed. Since the thermostatic working element 28, also by means of its working piston 28, does not project into the interior of the valve housing 10, the tightness of the valve housing 10 is not affected in the area of the piston-type projection 25.

The housing of the thermostatic working element 28 is open in the area of the finger-type projections 33 so that it is exposed to the ambient temperature. Since the valve housing 10 is manufactured of a heat-insulating plastic material, only a relatively low heat transmission takes place from the interior of the valve housing 10, that is, from the coolant, in the direction of the thermostatic working element 28.

In order to keep this heat transmittance low, it is also provided that the transmitting element 18 is made of a heat-insulating material, particularly a plastic material. In addition, cooling ribs 34 are provided in certain embodiments which are molded on in the area of the receiving device 29.

The length of the bore of the transmitting element 18, which receives the working piston 17, is dimensioned such that a predetermined idle path exists before the end of the working piston 17 comes to rest on the end of this axial bore. This idle path is bridged either by the moving-out of the working piston 28a of the thermostatic working element 28 or by the moving-out of the working piston 17, so that the opening lift of the valve 14, 15 does not start before this idle path is bridged.

In order to press the working piston 28a of the working element 28 as well as the working piston 17 back into the initial position when the temperature falls, a spreading spring 35 is arranged between the transmitting element 18 and the working piston 17. This spreading spring 35 is supported on a spring plate 36 molded to the transmitting element 18 and on a spring plate 37 held by means of a securing disk on the working piston 17.

Instead of the finger-type projections 33, other fastening or holding devices may also be provided for the housing of the thermostatic working element 28 and the securing spring 31. For this purpose, arbitrary formlocking holding devices, for example, in the form of quarter-turn fasteners, or the like, may be provided.

Furthermore, instead of a second thermostatic working element 28, another adjusting member which can be driven by an outside correcting variable, such as a spindle motor, or the like, can be used.

Likewise, it is possible to use, instead of the sealing ring 26, other sealing devices which seal off the area in which the rod projection 25 of the transmitting element 18 is guided toward the outside through the valve housing 10 to the receiving device 29. It is possible, for example, to provide a diaphragm as a sealing element.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A thermostatic valve arrangement for a coolant control of an internal-combustion engine, comprising:
   a first thermostatic working element which is assigned to a coolant flow and having a working piston;
   a valve housing make of plastic and which includes an integral receiving device;
   an adjusting member arranged outside the coolant flow in the receiving degree;
   an abutment coupled to the adjusting member and which is adjustable by the adjusting member, the working piston being supported on the abutment;
   holding elements which detachably hold the adjusting member in the receiving device;
   a sealing device in the valve housing; and
   at least one transmitting device between the abutment and the working piston which transmits pressure forces and which cooperates with the sealing device to seal off the receiving device from the coolant flow.

2. A thermostatic valve arrangement according to claim 1, further comprising a bore which extends in the housing from the receiving device towards the working piston, and a rod of the transmitting element which guides the transmitting element in the bore, wherein the sealing device surrounds the rod.

3. A thermostatic valve arrangement according to claim 2, wherein the adjusting member is a second thermostatic working element having a working piston with a stem, the abutment being defined by the stem, the adjusting member being arranged in the receiving device in such a manner that the stem of the working piston of the second working element is arranged coaxially with respect to the working piston of the first working element, and wherein the transmitting element is made of heat-insulating material and is arranged between the two working pistons.

4. A thermostatic valve arrangement according to claim 3, wherein at least one of the valve housing and the receiving device has devices for reducing heat transmitted from the valve housing to the adjusting member.

5. A thermostatic valve arrangement according to claim 4, wherein the devices are cooling ribs which project toward the outside on the receiving device of the adjusting member.

6. A thermostatic valve arrangement according to claim 5, further comprising a coil spring which holds the adjusting member in the receiving device, and finger-type projections that extend from the receiving device and are provided with at least one inward projection which supports the coil spring.

7. A thermostatic valve arrangement according to claim 6, further comprising a valve closing spring and finger-type holding elements molded to the valve housing and which project into an opening direction of a valve of the valve arrangement to form a support for the valve closing spring.

8. A thermostatic valve arrangement according to claim 1, wherein the adjusting member is a second thermostatic working element having a working piston with a stem, the abutment being defined by the stem, the adjusting member being arranged in the receiving device in such a manner that the stem of the working piston of the second working element is arranged coaxially with respect to the working piston of the first working element, and wherein the transmitting element is made of heat-insulating material and is arranged between the two working pistons.

9. A thermostatic valve arrangement according to claim 1, wherein at least one of the valve housing and the receiving device has devices for reducing heat transmitted from the valve housing to the adjusting member.

10. A thermostatic valve arrangement according to claim 9, wherein the devices are cooling ribs which project toward the outside on the receiving device of the adjusting member.

11. A thermostatic valve arrangement according to claim 1, further comprising a coil spring which holds the adjusting member in the receiving device, and finger-type projections that extend from the receiving device and are provided with at least one inward projection which supports the coil spring.

12. A thermostatic valve arrangement according to claim 1, further comprising a valve closing spring and finger-type holding elements molded to the valve housing and which project into an opening direction of a valve of the valve arrangement to form a support for the valve closing spring.

* * * * *